United States Patent [19]

Lefebvre

[11] 3,725,335

[45] Apr. 3, 1973

[54] BINDERS FOR MORTARS

[75] Inventor: Gerard Lefebvre, Lyon, France

[73] Assignee: Produits Chimiques Pechiney-Saint-Gobain, Neuilly-sur-Seine, France

[22] Filed: Feb. 17, 1971

[21] Appl. No.: 115,993

[30] Foreign Application Priority Data

Feb. 23, 1970 France..................................7006349

[52] U.S. Cl..................260/40 R, 260/41 A, 260/862
[51] Int. Cl..............................................C08f 29/50
[58] Field of Search....................260/862, 40 R, 41 A

[56] References Cited

UNITED STATES PATENTS 2,819,248  1/1958  Casebolt..........................260/862 X
3,423,224  1/1969  Schmidt et al.....................260/40 X
3,129,110  4/1964  Anderson.........................260/862 X
3,227,665  1/1966  Fourcade et al..................260/862 X Primary Examiner—Allan Lieberman
Assistant Examiner—S. M. Person
Attorney—McDougall, Hersh & Scott

[57] ABSTRACT

An organic resinous binder composition which reduces shrinkage and shrinkage cracks in mortars formed thereof wherein the binder composition is formulated of an unsaturated polyester and a vinyl monomer such as styrene as the basic components and which includes a polyvinyl acetate in an amount within the range of 0.5 to 2 percent by weight and preferably 0.8 to 1.4 percent by weight of the unsaturated polyester and vinyl monomer.

4 Claims, 1 Drawing Figure

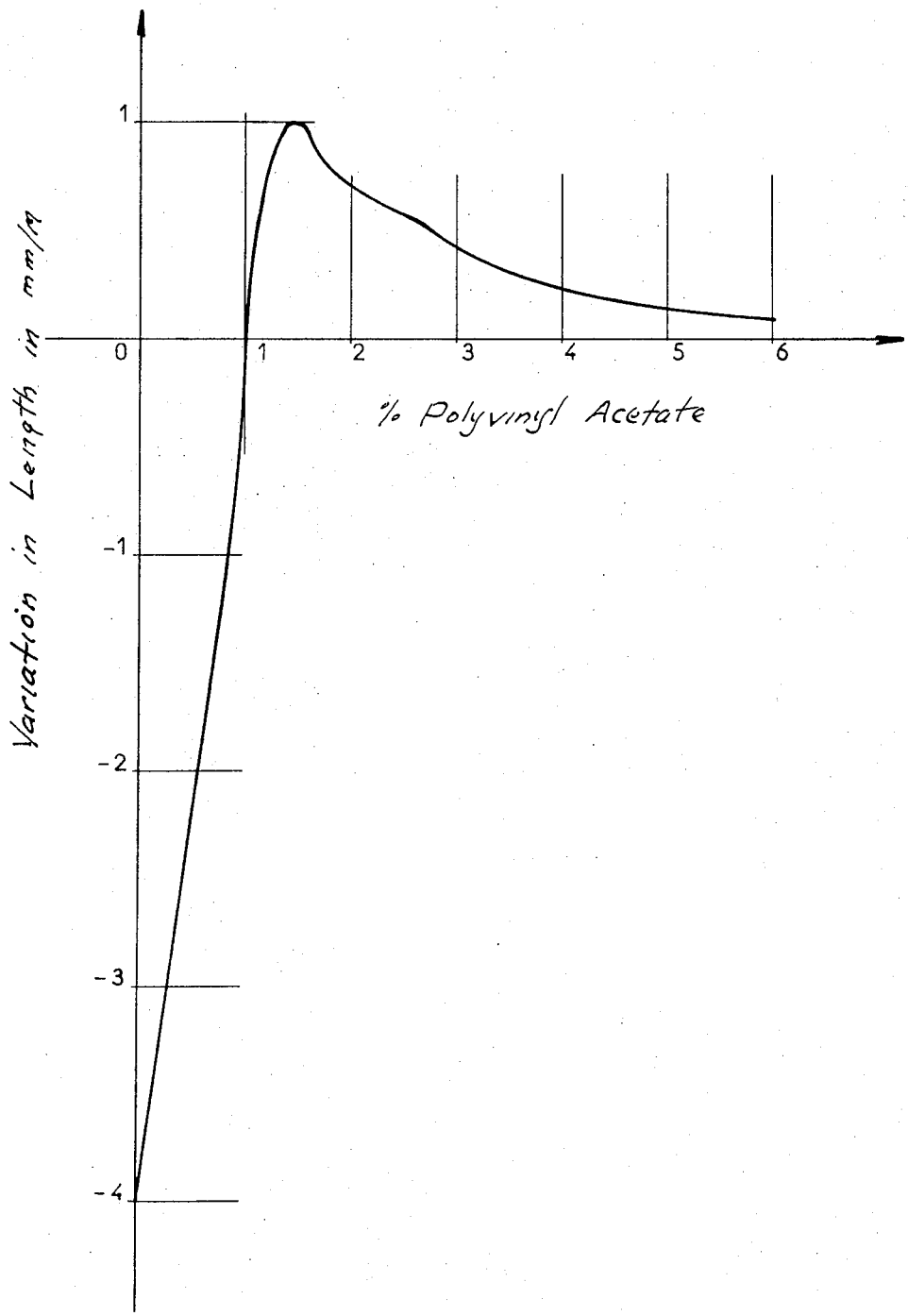

BINDERS FOR MORTARS

This invention relates to resinous binder compositions for use with mortars and to mortar compositions embodying the same.

Mortars and concretes have been prepared of mineral fillers combined with organic resinous binders formed of an unsaturated polyester, a vinyl monomer such as styrene, and a polymerization catalyst which brings about the hardening of the polyester at room temperature. Such mortars are generally prepared by the admixture of filler and binder at the station of use, such as a building yard, to enable application to be made before the polyester resin has a chance to harden. Hardening is accompanied by a considerable amount of shrinkage which results in the formation of cracks and a most undesirable dimensional change.

In the attempt to overcome these deficiencies, it has been proposed to add an amount of another polymer, such as polystyrene, polyisobutene, polyvinyl ethers, as described in French Pat. No. 1,137,834. However, the cited patent indicates that the materials are incapable of formulation into a homogeneous mixture with the result that the components tend to separate upon standing. This requires thorough mixing of the ingredients before use, especially when the mass of material has not immediately all been used up. In addition, the French patent states that it is important that the amount of polymer added should be 12 percent or more by weight.

It is an object of this invention to produce a resinous composition for use in mortars and the like materials, wherein the resinous composition is formulated with a special polymer that is employed in lesser amounts, in which the binder composition produced therewith remains stable over long periods of time or storage, and which, when mixed with mineral fillers, produces mortars or concretes which are characterized by relative freedom from cracks and shrinkage.

It has been found in accordance with the practice of this invention that a self-hardenable, homogeneous resinous composition for use in the preparation of improved mortars, concretes and similar products can be achieved when the unsaturated polyester resin and styrene or other monomer is formulated to contain a polyvinyl acetate in an amount within the range of 0.5 to 2 percent by weight of the unsaturated polyester and monomer.

As the polyester component, use can be made of the conventional unsaturated polyesters which are hardenable at low temperature by a vinyl monomer, preferably styrene. Amongst the unsaturated polyesters, the ones most commonly used are those prepared of maleic acid or anhydride and an aliphatic and/or aromatic di-acid or anhydride and glycol or a mixture of glycols. It is preferred to make use of a polyester in which the glycol is ethylene glycol or a mixture of glycols which includes ethylene glycols.

The amount of polyvinyl acetate may range from 0.5 to 2 percent by weight but it is preferred to make use of the polyvinyl acetate in an amount within the range of 0.8 to 1.4 percent by weight of the resinous composition formed of the polyester and the vinyl monomer. Styrene is generally selected as the vinyl monomer with which the polyester is hardened. With the use of styrene as the vinyl monomer, the polyester can be dissolved in one portion of the styrene and the polyvinyl acetate can be dissolved in the remainder, after which the two solutions are mixed with agitation to produce a stable mixture. Such mixture can be stored for several weeks without loss of homogeneity. Use can be made of the usual catalyst for hardening unsaturated polyesters, such as a peroxide catalyst as represented by benzoyl peroxide, methyl-ethyl-ketone peroxide and the like, preferably with the addition of an activator such as dimethyl aniline or cobalt octoate. It is sufficient if the catalyst component is added to the mixture at the time of use.

The amount of vinyl monomer may range from 59 to 70 percent by weight of the unsaturated polyester.

The amount of resinous binder may range from 9.5 to 13 percent by weight of the inorganic filler.

The following example of the preparation of a binder composition and its use in the production of a mortar is given by way of illustration of the practice of the invention, but not by way of limitation:

EXAMPLE 1

Binder composition:

A polyester is prepared by heating a mixture of maleic, adipic and phtalic acid in the molar ratio of 12/1/11 and a mixture of ethylene glycol and propylene glycol in the ratio of 1/2 with the materials combined in the molar ratios set forth above and heating to a temperature of 200° C. The polyester is formed to a molecular weight average of 2,160 and an acid number of 31. When the esterification is over, 1,050 grams of the polyester are poured into 1,138 grams of styrene containing 0.17 grams of hydroquinone. The polyester is poured with stirring to prevent temperature rise to above 80° C.

To 167 grams of the mixture, cooled to room temperature, there are added 53 grams of a 4 percent by weight solution of polyvinyl acetate in styrene. The polyvinyl acetate is of the type marketed under the trademark "Rhodopas M" by Rhone-Poulenc. It is a medium viscosity polyvinyl acetate having a melting point of 100°±5° C. The mixture is stirred for about 15 minutes to produce a homogeneous mixture which remains stable without separation over an extended period of storage so that it can be used for the production of mortars several weeks after preparation, without the need for additional agitation.

Mortar preparation:

To 55 grams of the resinous binder composition there is added 1 gram of a mixture of 55 percent by weight benzoyl peroxide and 45 percent by weight tricresyl phosphate and 0.1 cm$^3$ of dimethyl aniline. The above composition is mixed with 156 grams of quartz having a particle size within the range of 1.5 to 2 mm, 156 grams of quartz sand having a granular size within he range of 0.7 to 1.2 mm, and 133.5 grams of calcareous filler. The slurry that is formed is cast into a rectangular mold having a length of 300 mm, a width of 80 mm and a depth of 5 mm and allowed to cure.

Measurements are made by a linear motion recorder of the change in length as against time. After 24 hours, a linear shrinkage of 0.1 to 0.3 mm per meter is measured which corresponds to only a 0.01 to 0.03 percent shrinkage. The sample remains very uniform without cracking or noticeable surface modification.

The same test was repeated but without the addition of polyvinyl acetate. The hardened mortar that was produced had cracks over the entire surface and the amount of shrinkage that was measured was 0.4 percent which is 20 times greater than that prepared with polyvinyl acetate.

Another series of tests was carried out by the procedure previously described but in which the amount of polyvinyl acetate in the resinous composition was varied between 0 to 6 percent by weight. The accompanying curve shows the results that were secured in which the dimensional change of the mortar test piece was related to the amount of polyvinyl acetate in the binder.

It will be seen from the curve that within the preferred range of 0.8 to 1.4 percent by weight polyvinyl acetate, the dimensional stability is markedly improved with a minus value of up to ±1 percent being secured with binder compositions containing more than 1 percent by weight polyvinyl acetate. While the dimensional change remains very low with still higher amounts of polyvinyl acetate in the binder composition, the mortars obtained when the resinous material contains more than 0.2 percent by weight polyvinyl acetate are materially altered in their mechanical properties, particularly in their compression strength and flexural strength which are properties important to the use of mortars and concretes. It is undesirable to make use of a resinous binder of the type described in which the amount of polyvinyl acetate is less than 0.5 percent by weight or more than 2 percent by weight.

It will be understood that changes may be made in the details of formulation and operation without departing from the spirit of the invention, especially as defined in the following claims.

I claim:

1. A mortar composition comprising a mineral filler and 9.5 to 13 percent by weight based on the mineral filler of a resinous binder comprising a hardenable mixture of an unsaturated polyester, 59–70 percent by weight of a vinyl monomer based on the polyester and 0.8–1.4 percent by weight of polyvinylacetate based upon the total of the polyester and vinyl monomer.

2. A composition as defined in claim 1 wherein the vinyl monomer is styrene.

3. A composition as defined in claim 1 which includes a catalytic amount of a polymerization catalyst.

4. A composition as defined in claim 1 which includes a polymerization catalyst and an activator.

* * * * *